United States Patent
May et al.

(10) Patent No.: US 9,878,398 B2
(45) Date of Patent: Jan. 30, 2018

(54) AUTOMATED DYNAMIC LASER PEENING SYSTEM

(71) Applicants: Gary J. May, Plain City, OH (US);
Jeff L. Dulaney, Delaware, OH (US);
Keith Glover, Dublin, OH (US)

(72) Inventors: Gary J. May, Plain City, OH (US);
Jeff L. Dulaney, Delaware, OH (US);
Keith Glover, Dublin, OH (US)

(73) Assignee: LSP TECHNOLOGIES, INC., Dublin, OH (US)

( * ) Notice: Subject to any disclaimer, the term of this patent is extended or adjusted under 35 U.S.C. 154(b) by 595 days.

(21) Appl. No.: 14/541,140

(22) Filed: Nov. 13, 2014

(65) Prior Publication Data

US 2016/0136757 A1    May 19, 2016

(51) Int. Cl.
| | |
|---|---|
| *B23K 26/00* | (2014.01) |
| *B23K 26/06* | (2014.01) |
| *B23K 26/08* | (2014.01) |
| *C21D 10/00* | (2006.01) |
| *B23K 26/356* | (2014.01) |
| *B23K 26/0622* | (2014.01) |

(52) U.S. Cl.
CPC ...... *B23K 26/0884* (2013.01); *B23K 26/0624* (2015.10); *B23K 26/356* (2015.10); *C21D 10/005* (2013.01)

(58) Field of Classification Search
CPC ......... B23K 26/00; B23K 26/06; B23K 26/08
USPC .......................... 219/121.61–121.72, 121.78, 219/121.81–121.83
See application file for complete search history.

(56) References Cited

U.S. PATENT DOCUMENTS

| | | | | |
|---|---|---|---|---|
| 4,857,697 A | * | 8/1989 | Melville | B23K 26/0613 219/121.63 |
| 4,907,169 A | * | 3/1990 | Lovoi | B23K 26/04 219/124.34 |
| 4,940,925 A | | 7/1990 | Wand et al. | |
| 5,790,620 A | * | 8/1998 | Okazaki | B23K 26/0069 134/1 |
| 5,896,297 A | | 4/1999 | Valerino | |
| 6,528,763 B1 | | 3/2003 | Lahram et al. | |
| 6,867,390 B2 | * | 3/2005 | Clauer | G01N 21/95 219/121.78 |
| 6,881,925 B1 | * | 4/2005 | Sato | B23K 26/0069 219/121.73 |
| 7,775,122 B1 | * | 8/2010 | Toller | G01N 19/04 73/760 |
| 7,784,348 B2 | | 8/2010 | Dubois et al. | |
| 8,243,280 B2 | | 8/2012 | Dubois et al. | |
| 2005/0120803 A1 | * | 6/2005 | Sokol | G01N 29/2412 73/801 |

(Continued)

OTHER PUBLICATIONS

Advanced Robotic Vehicles, Inc. (ARVI) Autocrawler M50, product description [online], dated Dec. 14, 2001 [retrieved Nov. 13, 2014]. Retrieved using WayBack Machine Internet Archive <URL: https://web.archive.org/web/20112140918 07/http://www.arvirobots.com/M50.html>.

*Primary Examiner* — Samuel M Heinrich
(74) *Attorney, Agent, or Firm* — Benesch, Friedlander, Coplan & Aronoff LLP

(57) ABSTRACT

Methods, systems, and apparatuses are disclosed for automated dynamic laser peening of a workpiece. In one embodiment, a system for automated dynamic laser peening of a workpiece comprises: a laser; a laser beam delivery system; and a dynamic platform system.

17 Claims, 6 Drawing Sheets

(56) References Cited

U.S. PATENT DOCUMENTS

| | | | | |
|---|---|---|---|---|
| 2007/0108169 A1* | 5/2007 | Shimada | .............. | C21D 10/005 |
| | | | | 219/121.85 |
| 2011/0253690 A1* | 10/2011 | Dane | ................. | G02B 27/0927 |
| | | | | 219/121.74 |
| 2012/0151978 A1* | 6/2012 | Zepp | ....................... | B21C 37/12 |
| | | | | 72/6.1 |
| 2013/0295338 A1* | 11/2013 | Keating | .............. | B29C 67/0055 |
| | | | | 428/174 |
| 2014/0271328 A1* | 9/2014 | Burris | ................. | B23K 26/034 |
| | | | | 419/53 |
| 2016/0136757 A1 | 5/2016 | May et al. | | |

* cited by examiner

AUTOMATED DYNAMIC LASER PEENING SYSTEM

BACKGROUND

The laser peening ("LP") process, a substitute process for traditional shot peening, is a coldworking process used to produce a compressive residual stress layer and modify mechanical properties of materials by impacting the material with enough force to create plastic deformation. The residual stresses created by the LP process increase a material's resistance to fatigue and stress, and the LP process can be used to strengthen and harden materials. LP uses high energy laser pulses to lase both transparent and opaque overlays on a surface of a workpiece to generate a plasma plume and cause a rapid rise of pressure on the surface of a workpiece. This pressure creates and sustains a shockwave, which propagates through a workpiece material. The shockwave generated by LP induces coldwork into the microstructure of the workpiece material and contributes to the increased performance of the workpiece material. As the shockwave travels into the workpiece, some of the energy of the wave is absorbed during the plastic deformation of the workpiece material. This is also known as coldworking. The shockwave permanently stretches the internal structure of the workpiece material. This plastic deformation generates compressive residual stresses in the workpiece material, and increases the strength of the workpiece material. LP uses a laser pulse width of about 8 nanoseconds (ns) to about 40 ns. A typical spot diameter for a laser beam in LP is about 1.0 mm to about 6.0 mm. Fluence is the measure of energy delivered per unit area, and in LP applications, fluence is typically over 100 $J/cm^2$.

Current LP equipment is large, and a workpiece must either be positioned to align with LP equipment or LP equipment must be manually positioned around a workpiece for LP processing. While manual positioning of a workpiece and LP equipment is acceptable for relatively small workpieces, use of such LP techniques is more challenging with larger assemblies such as turbine blades, engine components, and the like. U.S. Pat. Nos. 5,741,559; 6,288,358; 6,528,763; and 6,867,390 (all to LSP Technologies, Inc.), all of which are incorporated herein by reference in their entireties, disclose improvements to laser peening system mobility.

The present application is directed to novel systems and methods for automating a LP process.

SUMMARY

Systems and methods are provided for automated, dynamic laser peening of a workpiece.

In one embodiment, a system for automated dynamic laser peening of a workpiece is provided, the system comprising: a laser beam delivery system operable to deliver a laser beam from a laser to a workpiece for laser peening the workpiece; and a dynamic platform system, operable to move the laser beam delivery system in one or more axes of translation and one or more axes of rotation.

In another embodiment, an automated and dynamic system for laser peening a workpiece is provided, the system comprising: (1) a laser, the laser configured to generate a pulsed laser beam; (2) a laser beam delivery system operatively connected to the laser and operable to deliver the pulsed laser beam to at least one of: a workpiece surface, and a processing head; (3) a dynamic platform system operable to support and move one or more components of the automated and dynamic system for laser peening; and (4) a control system comprising at least one of: one or more processors, and one or more controllers, wherein the control system is operable to execute an instruction set, process input and output signals, and control one or more components of the automated and dynamic system for laser peening.

In another embodiment, a method for automated laser peening of a workpiece is provided, the method comprising: (1) defining coordinates of a first laser peening target in a series of laser peening targets and/or a first laser peening target location and subsequent laser peening target location on a workpiece; (2) automatically positioning a laser beam in relation to the coordinates; (3) lasing a surface of the workpiece with a pulsed laser beam, each pulse having a pulse energy of between about 3 J and about 50 J; (4) detecting a laser peening processing condition; and (5) repeating steps 3-4 after repositioning the laser beam to the coordinates of a subsequent laser peening target in the series of laser peening targets and/or a subsequent laser peening target on the workpiece.

In another embodiment, an automated, dynamic LP system is self-contained and sits on a mobile platform to facilitate rapid insertion of a LP process into manufacturing plant operations or maintenance depots.

In another embodiment, an automated, dynamic LP system is automated to laser peen workpieces with minimal manual movements to introduce coldwork into workpieces, provide improved laser peening repetition, provide improved laser peening accuracy, and reduce LP operational cost.

In another embodiment, an automated dynamic LP system is automated to both position a processing head and facilitate movement of a laser and a laser beam delivery system around a large structure, so that a processing head may be automatically positioned on different parts of a large structure without requiring movement of the large structure to position the processing head.

BRIEF DESCRIPTION OF THE DRAWINGS

The accompanying figures, which are incorporated in and constitute a part of the specification, illustrate example systems and methods, and are used merely to illustrate example embodiments.

DETAILED DESCRIPTION

Figure 1:
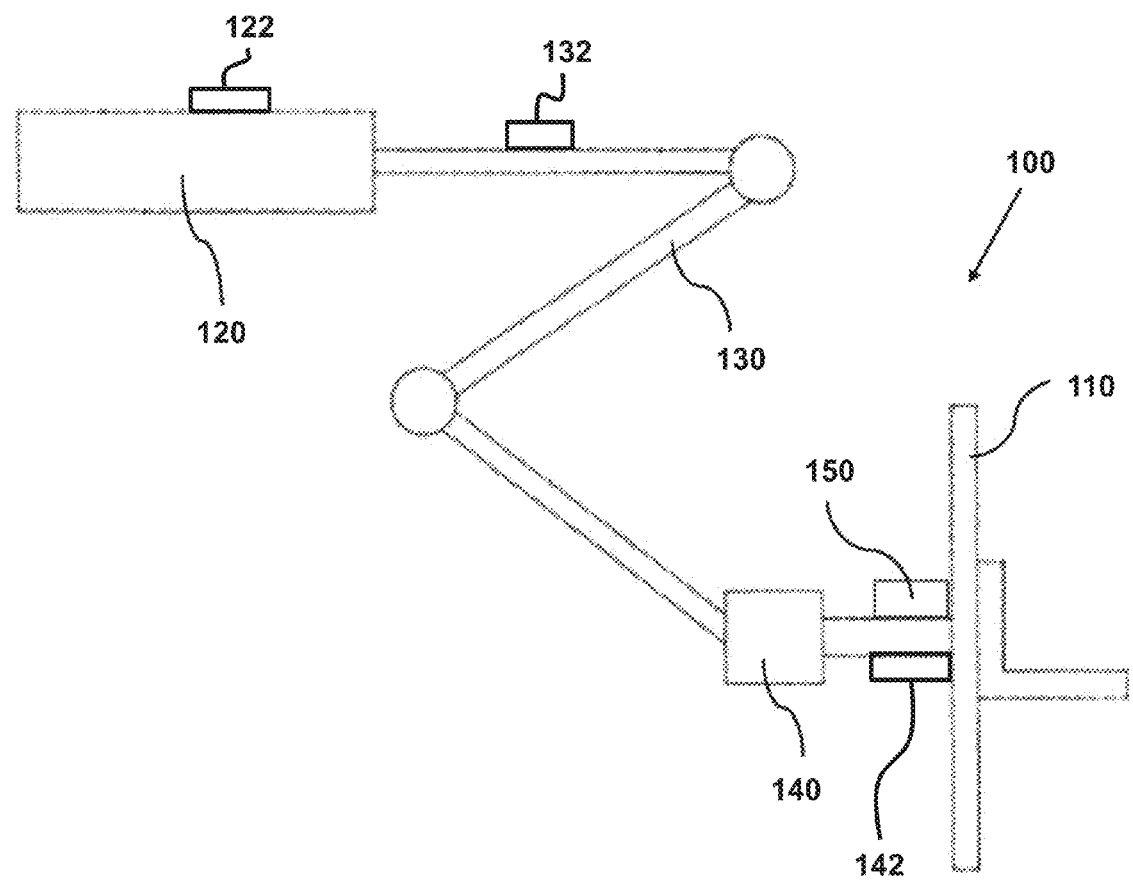
FIG. 1 illustrates an example arrangement of a laser peening system.

The embodiments claimed herein disclose using an automated, dynamic laser peening system for laser peening a workpiece. With reference to FIG. 1, an example system 100 for laser peening a workpiece 110 is illustrated. System 100 may comprise: a laser 120; one or more laser feedback sensors 122; a laser beam delivery system 130; one or more laser beam delivery feedback sensors 132; a processing head 140; one or more processing head sensors 142; and a laser peening processing condition sensor 150. In one embodiment, laser system 100 includes fixed laser 120 and laser beam delivery system 130 may or may not include processing head 140.

In one embodiment, laser 120 comprises at least one of: a neodymium glass laser, such as those manufactured by LSP Technologies, Inc., a YAG laser, a YLF laser, and any other solid-state crystal material, in either a rod or a slab gain medium. Laser 120 may be configured to deliver laser pulses having a pulse energy of between about 3 J and about 50 J (at the output of the final amplifier module), wavelengths between about 1053 nm and about 1064 nm; and pulse widths of between about 5 ns and about 40 ns. A typical spot diameter for a laser beam in LP is about 1.0 mm to about 6.0 mm. Fluence is the measure of energy delivered per unit area, and in LP applications, fluence is typically over 100 $J/cm^2$.

Further configurations of laser 120 may include those described and illustrated in U.S. Pat. Nos. 5,741,559; 6,288,358; 6,528,763; and 6,867,390.

In one embodiment, laser beam delivery system 130 comprises at least one of: (a) one or more mirrors; (b) an articulated arm; and (c) one or more fiber optics (also referred to as an optical fiber), and includes the laser beam delivery systems described and illustrated in U.S. Pat. Nos. 5,741,559; 6,288,358; 6,528,763; and 6,867,390. In one embodiment, where laser beam delivery system 130 is one or more mirrors, the beam is directed to the surface of workpiece 110 without a need for processing head 140. In another embodiment, where laser beam delivery system 130 is an articulated arm and fiber optics, laser beam delivery system 130 is operatively connected to processing head 140.

Additionally, processing head 140 may include a first output (not shown) to output a laser beam if processing head is operatively connected to laser beam delivery system 130, and second output (not shown) to output one or more overlays such as: a transparent overlay, an opaque overlay, an inspection coupon, a metal foil. Processing head may include one or more suction ports (not shown) to vacuum debris generated during a laser peening process proximate to processing head 140 and workpiece surface, and be used for vacuum attachment of processing head 140 to a workpiece.

In one embodiment, laser peening processing condition sensor 150, such as an EMAT coil, is integrated in processing head 140. Laser peening processing condition sensor 150 may be used to sense surface motion and other acoustic emissions on a surface of workpiece immediately after laser peening a workpiece. Laser peening processing condition sensor data may be correlated to at least one of: a theoretical shock pressure generated by a plasma during laser peening processing, residual stress profile of a workpiece, and fatigue life of a workpiece. Data collected by laser peening processing condition sensor 150 may be used for quality control and feedback data during laser peening. In another embodiment, laser peening processing condition sensor 150 is a radiometer that senses an intensity/irradiance of a plasma created during a laser peening process, and correlates at least one of: plasma irradiance, plasma intensity, plasma temperature, and plasma pressure to a laser peening processing condition such as theoretical shock pressure generated by a plasma during laser peening processing, residual stress profile of a workpiece, and fatigue life of a workpiece. In another embodiment, laser peening processing condition sensor 150 is separate from processing head 140, such as a remote optical interferometer (e.g. VISAR device). In another embodiment, laser peening processing condition sensor 150 is a Doppler velocimeter. In another embodiment, laser peening processing condition sensor 150 is a radiometer. Data collected by laser peening processing condition sensor 150 may be used to automate laser peening system 100.

Figure 3:
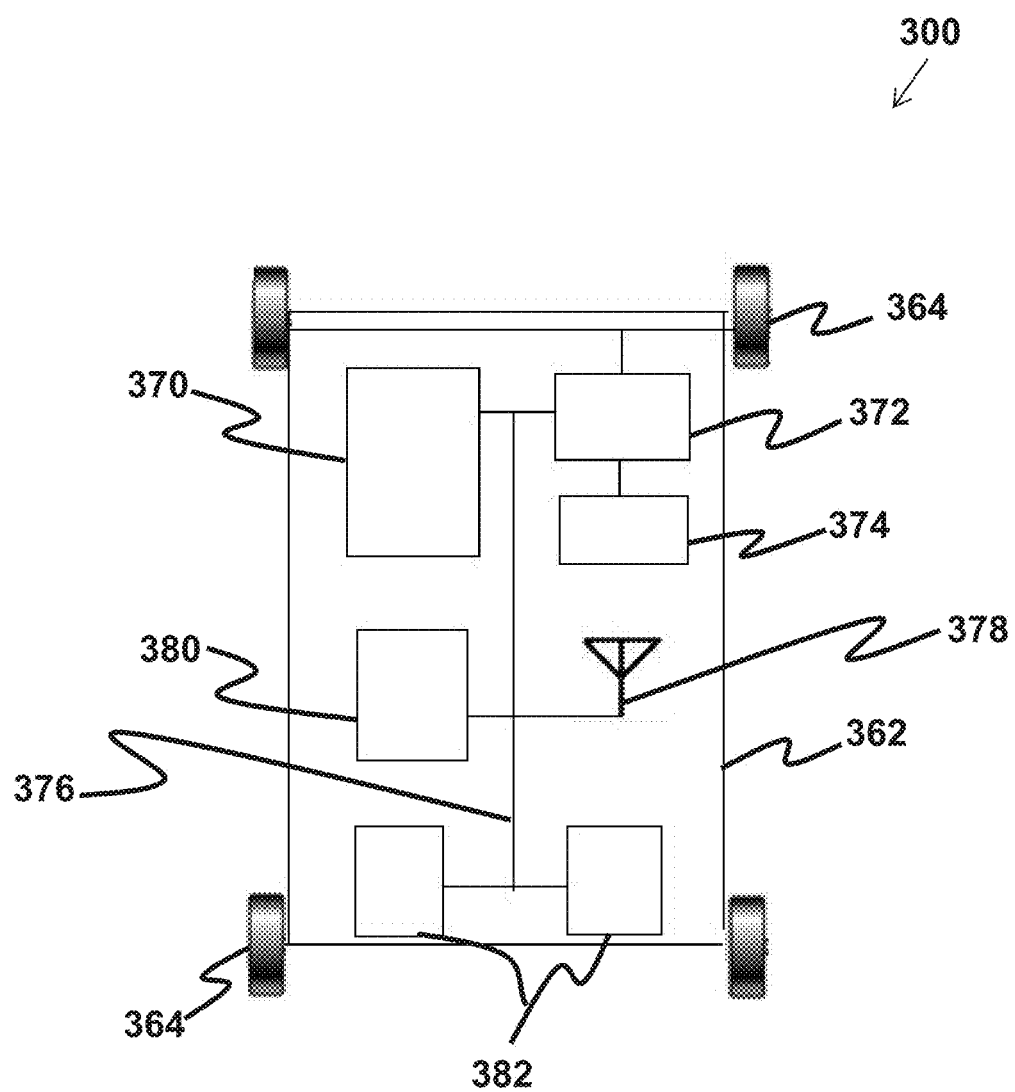
FIG. 3 illustrates a schematic arrangement of a dynamic platform.

Laser feedback sensor 122, laser beam delivery feedback sensor 132, and processing head sensor 142 may provide feedback to control units, e.g., control units 372 and 374, as depicted in and described herein with respect to FIG. 3. Laser feedback sensor 122, laser beam delivery feedback sensor 132, and processing head sensor 142 may be, but are not limited to any or all of: spatial position sensors, location position sensors, displacement sensors, alignment sensors, tilt sensors, cameras, optical sensors, phototransistors, accelerometers, Global Positioning System (GPS), magnetometers, gyroscopes, pressure sensors, gas sensors, voltage and current sensors, capacitive touch sensors, color detection, light detection, force sensors, infrared (IR) emitters/detectors, radio-frequency identification (RFID) sensors, laser beam profiler, potentiometers, thermistors, temperature and humidity sensors, ultrasonic rangefinders and echo location sensors, laser positioning, video imagining sensors, and the like. In one embodiment, feedback from sensors 122, 132, and 142 is used by control units 372 and 374 to assist in automated, dynamic LP. In one embodiment, laser feedback sensor 122 is a laser beam profiler which communicates laser beam parameters to control units 372 and 374. If feedback data from laser feedback sensor 122 is out of the control limits defined by an automated process, control units 372 and 374 may output control signals to laser 120 to produce a laser beam within proper parameters. In another embodiment, laser beam delivery feedback sensor 132 may be a position sensor sending laser beam delivery system position data to control units 372 and 374. In response to a detected change in laser beam delivery system position data, control units 372 and 374 may output a control signal to laser beam delivery system 130 to adjust mirrors based on new position data for proper operation of laser beam delivery system 130.

Figure 2:
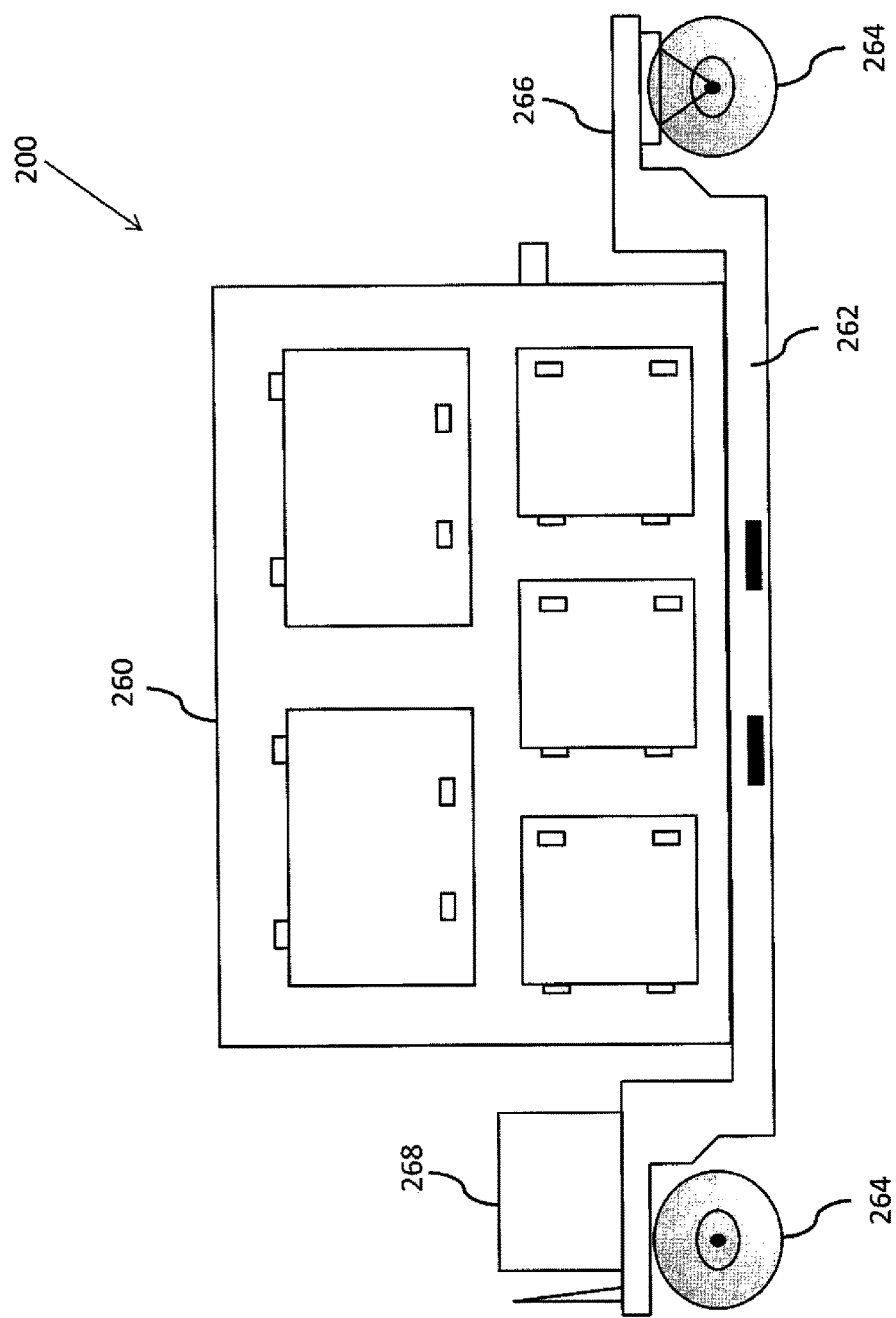
FIG. 2 illustrates a dynamic platform of an automated, dynamic laser peening system.

With reference to FIG. 2, an example of a dynamic platform 200 of an automated, dynamic LP system is illustrated. Dynamic platform 200 may comprise a cabinet housing 260 which may contain one or more components of an LP system, for example those components illustrated in LP system 100. Housing 260 may be operatively connected to a chassis 262. Chassis 262 may have one or more movement devices 264 for facilitating movement of dynamic platform 200. Chassis 262 may include one or more platform areas 266. Platform areas 266 may be used to mount an articulated arm and/or laser beam delivery system, for example, an articulated arm 434 and/or laser beam delivery system 430, as illustrated in and described herein with respect to FIG. 4. Platform area 266 may also be used to mount integral parts of LP system 100 such as chiller 268, where chiller 268 is better suited in an open environment for heat exchange purposes than inside housing 260. As used herein, components of an automated and dynamic system for laser peening may refer generally to, and may include any and all of: a laser, a laser beam delivery system, a processing head, a surface motion sensor, a dynamic platform, and a control system. As also used herein, movement of an automated and dynamic system for laser peening may be translational—that is along one of an x, y, or z axis, or rotational—that is, rotate about an x, y, or z axis.

With reference to FIG. 3, an example schematic view of dynamic platform 300 is illustrated. Chassis 362 may be of a strong, durable material, such as steel, and chassis material selection may be based on various build specifications depending on an intended use of dynamic platform 300. In one embodiment, where chassis 362 is intended for ground use, chassis 362 is one of: a truck, a trailer, a cart, a wagon, a trolley, or the like. In one embodiment, chassis 362 is a lowboy trailer designed to accommodate and better distribute the weight of an LP system, such as LP system 100. Chassis 362 may be self-propelled or towed/pushed from another vehicle. In one embodiment, a self-propelled chassis 362 is powered from a common locomotive drive source 370 such as a combustion engine, an electric motor, or the like. In one embodiment, drive source 370 is powered from a low-emissions energy source well suited for use in manufacturing plants and maintenance depots such as: a battery powered traction motor; an electric bus bar powered electric motor; a liquefied propane gas (LPG) engine; a compressed air driven pneumatic motor, and the like.

Chassis 362 may contain one or more movement devices 364. Movement devices 364 may be one of: a wheel; a continuous track caterpillar tread; a railroad bogie, and the like, and movement devices 364 may be suited to a specific application of dynamic platform 300. In one embodiment, movement device 364 interfaces with one of: a rail system, a track, and a guide in a floor, on a wall, or on a ceiling of a facility, such that dynamic platform 300 is guided around the facility via rail, track, and guide. In one embodiment, movement device 364 is operatively connected to drive source 370. In one embodiment, movement device 364 is a combination of pivotable steering wheels and fixed drive wheels connected to an electronic control unit (ECU) 372 which controls power from drive source 370 to each drive wheel to provide dynamic platform 300 with a low turning radius steering capability. A dynamic platform 300 with a low turning radius may be advantageous for use in a manufacturing facility or maintenance depot where space concerns may require precise turning and increased maneuverability.

Dynamic platform 300 may be configured for automated operation in conjunction with an LP system, for example LP system 100. A control system for controlling dynamic platform 300 may include one or more controllers 372, 374, and one or more processors (not shown). Control system may be operable to execute an instruction set (i.e. programs), process input and output signals (i.e. from sensors), and control one or more components of the automated and dynamic system for laser peening. Controllers 372, 374 may be controllers used in process control such as a programmable logic controller (PLC). In one embodiment, ECU 372 is programmed to provide automated operation of dynamic platform 300 and LP system 100. Additionally, ECU 372 and one or more control units 374 may be programmed to provide specific automation functions such as laser control, laser beam delivery control, articulated arm control, processing head control, opaque overlay control, transparent overlay control, lift control, momentum trap control, steering control, drive source control, and the like. In one embodiment, all automation is controlled by ECU 372. In another embodiment, one or more control units 374 are used to control each specific automated function. Control units 372 and 374 may be electrically connected to other devices on dynamic platform 300 by a bus system 376. Bus system 376 may be any communications network capable of interconnecting electrical components known in the art such as: a wire harness; a CAN Bus; D2B; I$^2$C and the like.

In one embodiment, control units 372 and 374 are programmed remotely using a transceiver 378. Transceiver 378 may be operable to provide remote communication to and from control units 372 and 374. In one embodiment, transceiver 378 provides communications to and from: a remote control; another automated device; remote feedback sensors, and the like. In another embodiment, control units 372 and 374 are programmed by a user interface (UI) 380 provided on dynamic platform 300. In one embodiment, UI 380 is a control panel comprising easily customizable hardware and software, such as a job-specific, customized graphical user interface (GUI) on a touchscreen display to provide easy programming of both LP system 100 and dynamic platform 300. In another embodiment, a user inputs spatial coordinates of laser peening targets on a workpiece by either transceiver 378 or user interface 380. In another embodiment, laser peening targets are identified by one or more dynamic platform feedback devices 382.

One or more dynamic platform feedback devices 382 may be provided on dynamic platform 300 to provide feedback data to control units 372 and 374 to assist in automated laser peening operation. Dynamic platform feedback devices 382 may be sensors used to gather feedback information to provide for proper automation control of dynamic platform 300. Dynamic platform feedback devices 382 may include: spatial position sensors, location position sensors, displacement sensors, alignment sensors, tilt sensors, cameras, optical sensors, phototransitors, accelerometers, Global Positioning System (GPS), a laser beam profiler, magnetometers, gyroscopes, pressure sensors, gas sensors, voltage and current sensors, capacitive touch sensors, color detection, light detection, force sensors, infrared (IR) emitters/detectors, radio-frequency identification (RFID) sensors, potentiometers, thermistors, temperature and humidity sensors, ultrasonic rangefinders and echo location sensors, laser positioning, video imagining sensors and the like. In one embodiment, feedback device 382 is an echo location sensor that detects a temporary or fixed object in the path of dynamic platform 300. In this embodiment, in response to an output signal from feedback device 382, control units 372 or 374 cut power from drive source 370 to movement device 364 to stop movement of dynamic platform 300 to prevent injury or damage. In another embodiment, feedback device 382 is an optical sensor capable of recognizing a patterned indicia. In this embodiment, feedback device 382 detects a patterned tape outline on the manufacturing facility floor around a workpiece to be laser peened, and feedback device 382 provides feedback to control units 372 or 374 for steering dynamic platform 300 around a workpiece by following a path of patterned indicia. In another embodiment, feedback device 382 interfaces with sensors embedded within a facility wall, floor, and ceiling to guide dynamic platform 300 around the facility.

Figure 4:
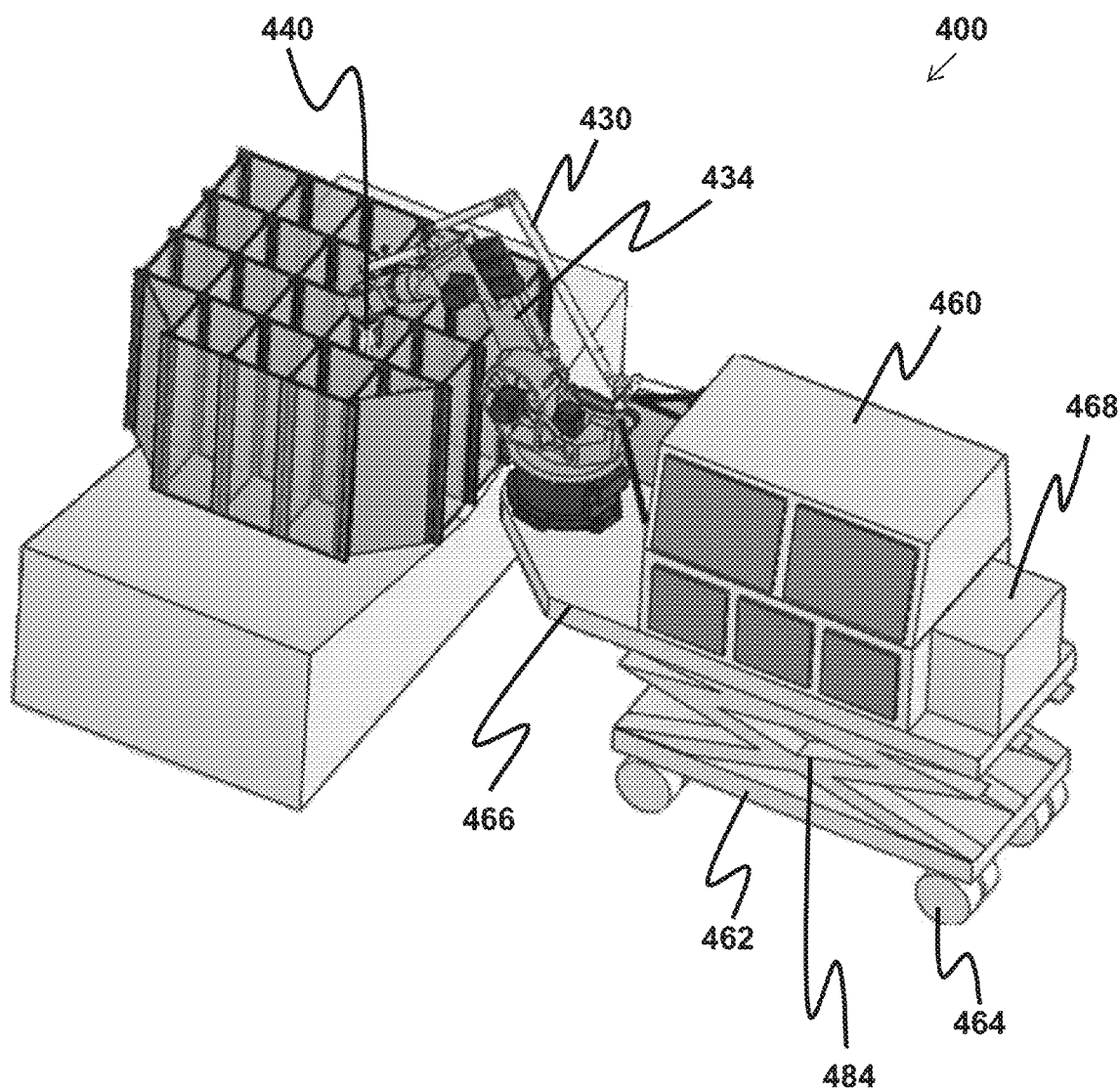
FIG. 4 illustrates an example arrangement of an automated, dynamic laser peening system.

With reference to FIG. 4, an example of automated, dynamic LP system 400 is illustrated. Automated, dynamic LBI system 400 may comprise a cabinet housing 460 which may contain one or more components of LP system 100. Cabinet housing 460 may be operatively connected to platform 466 which may be operatively connected to chassis 462. Chassis 462 may have one or more movement devices 464 for facilitating movement of automated, dynamic LP system 400. In one embodiment, platform 466 is used to mount integral parts of automated, dynamic LP system 400 such as an articulated arm 434 and chiller 468. Articulated arm 434 may be operatively connected to laser beam delivery system 430 and processing head 440. In one embodiment, chassis 462 is operatively connected to a lifting mechanism 484 for raising and lowering platform 466 to allow automated, dynamic LP system 400 to laser peen hard to reach workpiece targets on larger, assembled objects such as a turbine assembly mounted on a wing assembly. Platform 466 may include a linear actuation to linearly move platform 466 relative to chassis 462.

Lifting mechanism 484 may include: a scissor lift; a screw lift; one or more pneumatic, hydraulic, or mechanical actuators; a rack and pinion; a boom; a pulley system and the like.

Figure 5:
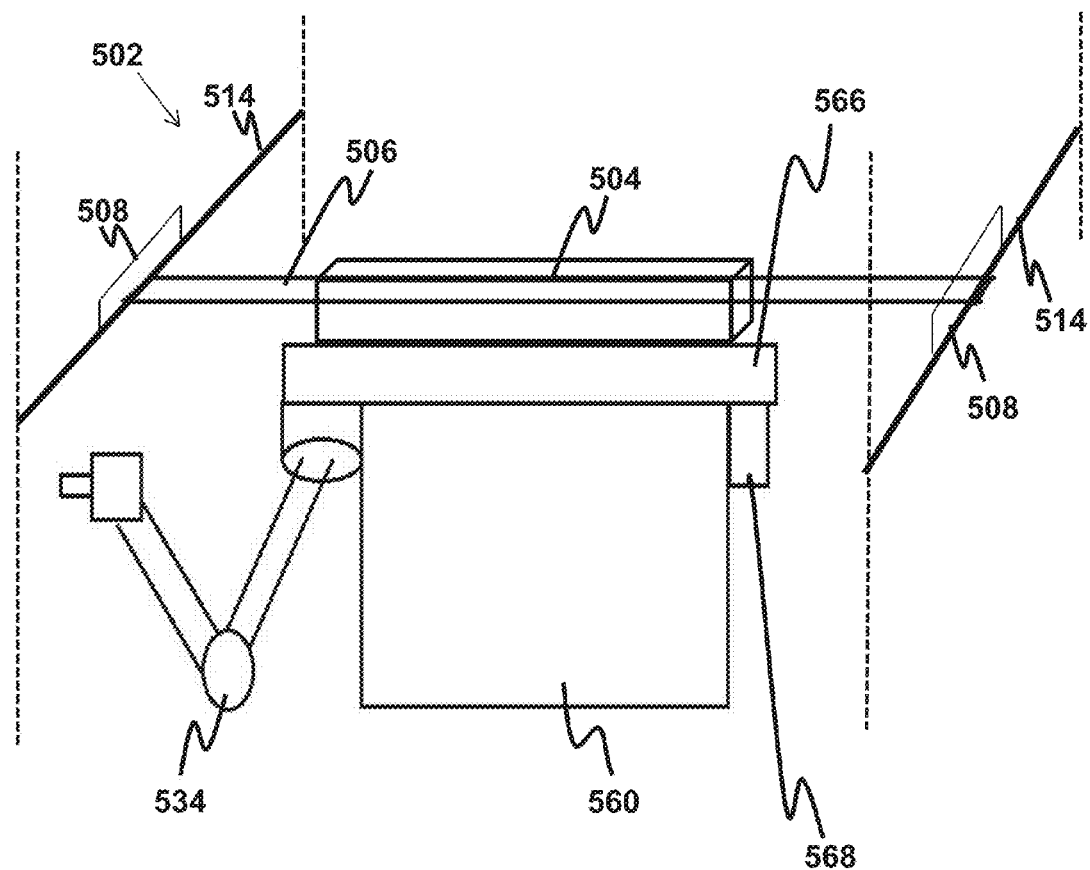
FIG. 5 illustrates an alternative embodiment of an automated, dynamic laser peening system.

With reference to FIG. 5, an alternative embodiment of automated, dynamic LP system 500 is illustrated. Automated and dynamic LP systems as described herein may either move relative to a floor, or ground surface—that is, the dynamic platform moves along the floor or ground, or move above a floor or ground. In embodiments, where dynamic platform moves above the ground or floor, an additional suspension component may be required to counteract gravity such that automated and dynamic LP system remains attached to a wall, ceiling, or the like. In one embodiment, automated, dynamic LP system 500 comprises a cabinet housing 560 containing one or more components of LP system 100. Cabinet housing 560 may be operatively connected to platform 566. In one embodiment, platform 566 is used to mount integral parts of the automated, dynamic LP system 500 such as an articulated arm 534 and chiller 568. In place of a chassis, drive system, and lift mechanism, automated, dynamic LP system 500 may be positioned using crane 502. Crane 502 may be any type of crane common to industrial environments such as: an overhead crane; a bridge crane; a gantry crane and the like. Crane 502 may comprise a trolley 504 to control linear position in one plane (i.e. y-plane) along bridge 506, while linear motion in the plane perpendicular to bridge 506 (i.e. x-plane) may be controlled by rollers 508 which move bi-directionally on beams 514 to control a position of bridge 506 in the x-plane. Of course, a motion system of crane 502 may also include additional axes of movement beyond these Cartesian coordinates, such as pitch, yaw, tilt, and rotation. A control system of automated, dynamic LP system 500 may be used to program crane 502 for automated positioning of automated, dynamic LP system 500. In one embodiment, platform 566 is mounted directly to trolley 504 and positioning of automated, dynamic LP system 500 in the z-plane may be achieved by providing a lifting/lowering mechanism (not shown) to beams 514 or by providing a lifting mechanism between platform 566 and trolley 504. A lifting mechanism may include: a wire and pulley, a pneumatic lift, a hydraulic lift, and like lifting mechanisms.

Figure 6:
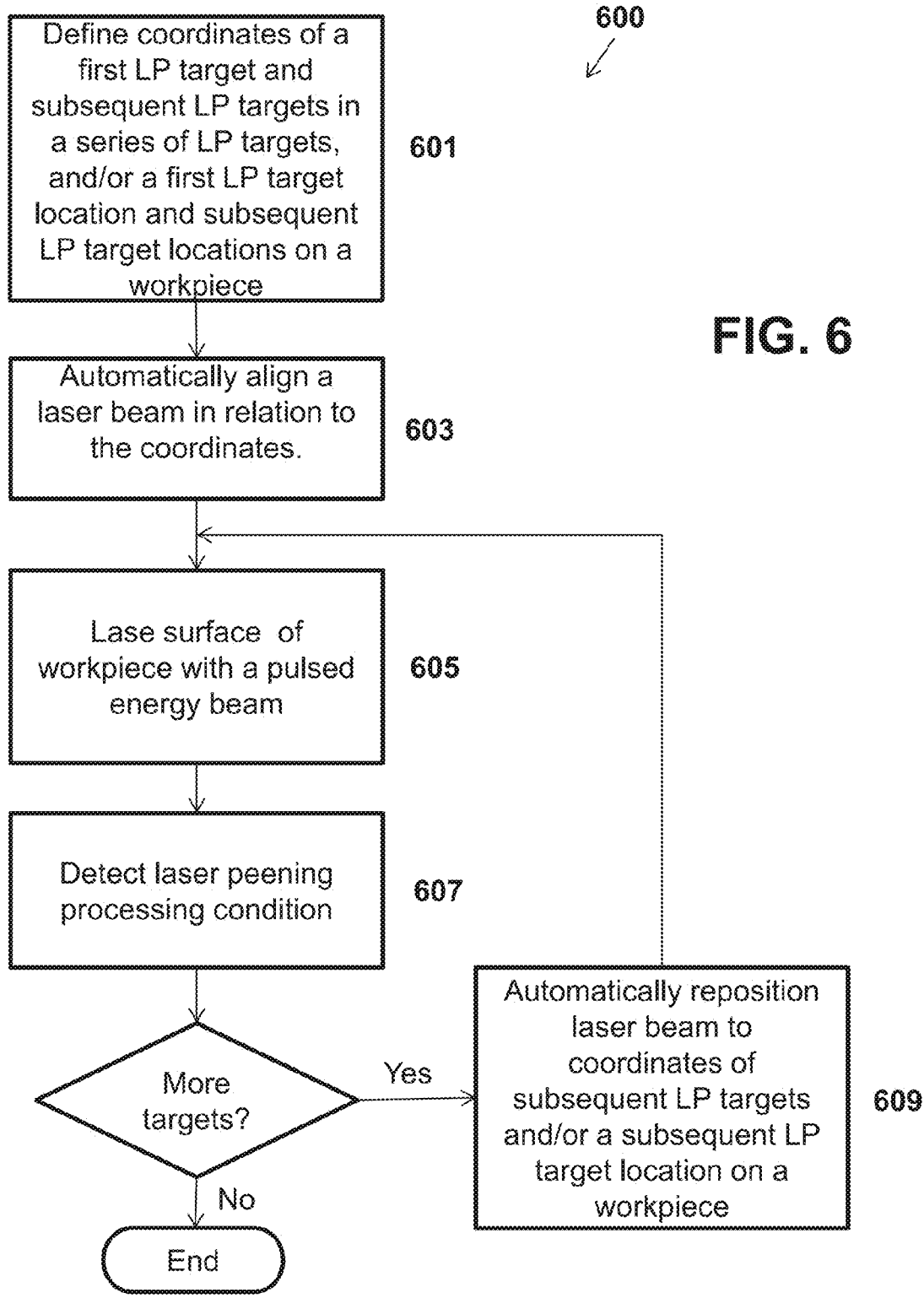
FIG. 6 is a flow chart of an example method for automated laser peening of a workpiece.

FIG. 6 is a flow chart of an example method 600 for automated laser peening of one or more targets on a workpiece. In one embodiment, method 600 includes the steps of: defining coordinates of a first laser peening target and subsequent laser peening targets in a series of laser peening targets and/or a first laser peening target location and subsequent laser peening target locations in a workpiece (601); automatically aligning a laser beam in relation to defined coordinates (603); lasing a surface of a workpiece with a pulsed laser beam, each pulse having a pulse energy of between about 3 J and about 50 J (605); detecting a laser peening processing condition on a workpiece (607); and repeating steps 605 and 607 after repositioning a laser beam to target coordinates of subsequent laser peening targets in a series of laser peening targets and/or a subsequent laser peening target location on a workpiece (609). It is understood that the several embodiments of an automated and dynamic LP system, as described above, may be used to perform method 600.

Unless specifically stated to the contrary, the numerical parameters set forth in the specification, including the attached claims, are approximations that may vary depending on the desired properties sought to be obtained according to the exemplary embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the systems, methods, and apparatuses have been illustrated by describing example embodiments, and while the example embodiments have been described and illustrated in considerable detail, it is not the intention of the applicants to restrict, or in any way limit, the scope of the appended claims to such detail. It is, of course, not possible to describe every conceivable combination of components or methodologies for purposes of describing the systems, methods, and apparatuses. With the benefit of this application, additional advantages and modifications will readily appear to those skilled in the art. Therefore, the invention, in its broader aspects, is not limited to the specific details and illustrative example and exemplary embodiments shown and described. Accordingly, departures may be made from such details without departing from the spirit or scope of the general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

As used in the specification and the claims, the singular forms "a," "an," and "the" include the plural. To the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. Finally, where the term "about" is used in conjunction with a number, it is intended to include ±10% of the number. In other words, "about 10" may mean from 9 to 11.

What is claimed:

1. A system for automated dynamic laser peening of a workpiece, the system comprising:
   a laser configured to generate a laser beam;
   a laser beam delivery system coupled to the laser and configured to provide the laser beam to a workpiece for laser peening a workpiece;
   a dynamic platform system comprising a crane configured to move the laser beam delivery system in one or more axes of translation and one or more axes of rotation relative to the workpiece; and
   a control system configured to control a position of the laser beam delivery system based on position data characterizing a position of the laser beam delivery system relative to the workpiece.

2. The system of claim 1, wherein the control system is configured to:
   determine a first spatial coordinate for a first laser peening location on a surface of the workpiece of a plurality of laser peening locations on the surface of the workpiece;
   position the laser beam delivery system relative to the first laser peening location based on the first spatial coordinate;
   provide the laser beam corresponding to a pulse laser beam to the first laser peening location based on the first spatial coordinate, wherein each pulsed laser beam has a pulse energy of between about 3 Joules (J) and about 50 J;
   determine a second spatial coordinate for a second laser peening location on the surface of the workpiece of the plurality of laser peening locations on the surface of the workpiece;
   position the laser beam delivery system relative to the second laser peening location based on the second spatial coordinate; and
   provide the pulsed laser beam to the second laser peening location based on the second spatial coordinate.

3. The system of claim 2, further comprising a user input device configured to receive the first spatial coordinate and the second spatial coordinate.

4. A system comprising:
   a laser configured to generate a laser beam;
   a laser beam delivery system coupled to the laser and comprising one or more mirrors configured to direct the laser beam to a surface of a workpiece during a laser peening process of the workpiece, wherein the laser beam delivery system comprises a feedback device configured to provide position data characterizing a position of the laser beam delivery system relative to the workpiece;
   a platform system configured to support the laser beam delivery system and configured to facilitate movement of the laser beam delivery system relative to the workpiece on a ground surface; and
   a control system configured to communicate and control one or more functions of the laser beam delivery system, wherein controlling the one or more functions comprises adjusting the one or more mirrors based on the position data to control an operating state of the laser beam delivery system during the laser peening process of the workpiece.

5. The system of claim 4, wherein the laser beam corresponds to a pulse laser beam, wherein the pulsed laser beam comprises a pulse energy between about 3-50 Joules per pulse and a pulse width between about 8-40 nanoseconds.

6. The system of claim 5, further comprising a laser peening process condition sensor configured to generate a signal characterizing a condition associated with the laser peening process of the workpiece, wherein the laser peening process condition sensor comprises one of one or more electromagnetic acoustic transducer (EMAT) sensors a piezoelectric gauge and a radiometer.

7. The system of claim 6, wherein the platform system comprises one of a locomotive drive system; a steering system a lifting and lower mechanism and a linear actuator, wherein a position and a movement of the platform system is controlled by the control system.

8. The system of claim 4, wherein the platform system is configured to move one or more components thereon in one or more axes of translation, and one or more axis of rotation.

9. The system of claim 7, wherein the platform system is configured to interface with a fixed guide system for changing a position of the platform system.

10. The system of claim 9, wherein the fixed guide system is one of a track, one or more rails, a cable, a lane, and an indicia.

11. The system of claim 4, wherein the platform system is configured to move on the ground surface, such that the platform system does not require an additional suspension component for movement along the ground surface.

12. The system of claim 4, wherein the laser is at a remote position relative to the platform system.

13. The system of claim 4, wherein the control system is configured to:
   determine a first spatial coordinate for a first laser peening location on the surface of the workpiece of a plurality of laser peening locations on the surface of the workpiece;
   position the laser beam delivery system relative to the first laser peening location based on the first spatial coordinate;
   direct via the one or more mirrors the laser beam corresponding to a pulse laser beam to the first laser peening location based on the first spatial coordinate, wherein each pulsed laser beam has a pulse energy of between about 3 Joules (J) and about 50 J;
   determine a second spatial coordinate for a second laser peening location on the surface of the workpiece of the plurality of laser peening locations on the surface of the workpiece;
   position the laser beam delivery system relative to the second laser peening location based on the second spatial coordinate; and
   direct via the one or more mirrors the pulsed laser beam to the second laser peening location based on the second spatial coordinate.

14. The system of claim 13, further comprising a user input device configured to receive the first spatial coordinate and the second spatial coordinate.

15. A method for laser peening a workpiece comprising:
   generating a pulsed laser beam for delivery to a workpiece during a laser peening process of a workpiece;
   determining a first spatial coordinate for a first laser peening location on a surface of the workpiece of a plurality of laser peening locations on the surface of the workpiece;
   positioning a laser beam delivery system comprising one or more mirrors relative to the first laser peening location, wherein positioning the laser beam delivery system comprises providing a platform system to support the laser beam delivery system and configuring the platform system to facilitate movement of the laser beam delivery system relative to the workpiece on a ground surface;

directing via the one or more mirrors the pulsed laser beam to the first laser peening location based on the first spatial coordinate, wherein each pulsed laser beam has a pulse energy of between about 3 Joules (J) and about 50 J;

determining a second spatial coordinate for a second laser peening location on the surface of the workpiece of the plurality of laser peening locations on the surface of the workpiece;

positioning the laser beam delivery system relative to the second laser peening location based on the second spatial coordinate;

receiving position data characterizing a position of the laser beam delivery system relative to the workpiece during the laser peening process of the workpiece;

adjusting the one or more mirrors based on the position data to control an operating state of the laser beam delivery system during the laser peening process of the workpiece; and directing via the one or more mirrors the pulsed laser beam to the second laser peening location based on the second spatial coordinate.

16. The method of claim 15, further comprising receiving at a user input device the first spatial coordinate and the second spatial coordinate.

17. The method of claim 16, wherein the platform system corresponds to a crane.

* * * * *